(12) United States Patent
Sheng et al.

(10) Patent No.: US 7,289,252 B2
(45) Date of Patent: Oct. 30, 2007

(54) FLAT-BED SCANNER USED IN COMBINATION WITH A SHEET FEEDER FIELD OF THE INVENTION

(75) Inventors: Thomas Sheng, Hsin Chu (TW); Chi-Yao Chen, Hsin Chu (TW)

(73) Assignee: Avision Inc. (TW)

( * ) Notice: Subject to any disclaimer, the term of this patent is extended or adjusted under 35 U.S.C. 154(b) by 1030 days.

(21) Appl. No.: 10/397,903

(22) Filed: Mar. 26, 2003

(65) Prior Publication Data

US 2004/0047005 A1  Mar. 11, 2004

(30) Foreign Application Priority Data

Sep. 4, 2002  (TW) ............................... 91213883 U

(51) Int. Cl.
*H04N 1/04* (2006.01)
*H04N 1/00* (2006.01)

(52) U.S. Cl. ..................................... 358/497; 358/400
(58) Field of Classification Search ................ 358/474, 358/496, 497, 483, 494, 400, 500
See application file for complete search history.

(56) References Cited

U.S. PATENT DOCUMENTS 5,864,408 A * 1/1999 Kumashiro ................. 358/461
7,072,082 B2 * 7/2006 Yokota ........................ 358/497

* cited by examiner

*Primary Examiner*—Douglas Q. Tran

(57) ABSTRACT

A flat-bed scanner in combination with a sheet feeder. The flat-bed scanner includes a first glass window having a top surface and a second glass window having a top surface. A height step is formed without increasing the difficult between the top surfaces of the first and second glass windows. When the sheet feeder is placed on the flat-bed scanner, the scanned documents may pass the first glass window smoothly, consequently, good scanning quality may be obtained.

5 Claims, 6 Drawing Sheets

FLAT-BED SCANNER USED IN COMBINATION WITH A SHEET FEEDER

FIELD OF THE INVENTION

The present invention relates to a flat-bed scanner in combination with a sheet feeder. The sheet feeder is placed on the flat-bed scanner so as to automatically feed the sheets and the scanner scan the sheets. The feeder has an optical module set which has a function of scanning so as to cooperate with the flat-bed scanner to scan the double sides of the documents.

BACKGROUND OF THE INVENTION

FIG. 1 discloses a feeder 10 being placed on a scanner 20 and the feeder 10 includes an upper guide plate 12 and two low guide plates 14, 16 located therein so as to define a passage 18 for feeding the sheets. When the feeder 10 is installed on the scanner 20, the low guide plates 14, 16 contact the glass window 22 of the scanner 20. When a document 24 is fed and pass the passage 18, the document is scanned by a scanning module set 23.

Because the low guide plate 16 has a certain thickness so that an end 17 of the low plate 16 protrudes from the glass window 22 and the document is blocked by the end 17 when it is fed.

The low guide plate 14 is located close to a surface of the glass window 22 and an end 15 of the low guide plate 14 protrudes from the glass window 22. However, the height difference between the end 15 and the glass window 22 is helpful for the feed of the document 24.

In order to resolve the problem of the jamming of the document 24, arranging the end 17 of the low guide plate 16 to be lower than the glass window 22 is a reasonable way.

FIG. 2 discloses that a first glass window 26 and a second glass window 28 are installed on the scanner 20. The first glass window 26 and the second glass window 28 are located in separate and a gap 25 is defined between the first glass window 26 and the second glass window 28. By this arrangement, the end 17 of the low guide plate 16 can be extended into the gap 25 and is located below the surface of the first glass window 26.

The two separate first glass window 26 and second glass window 28 make the volume of the scanner to be bulky and require two times of assembly for the assemblers.

FIG. 3 discloses a recess 27 is defined in the glass window 22 and a block 29 is engaged with the recess 27. The end 17 of the low guide plate 16 contacts the block 29. When the document 24 is fed, the block 29 guides the document 24 to move toward the low guide plate 16 smoothly.

The recess 27 requires two times of machining on the surface of the glass window 22 and this increases the manufacturing cost of the glass window 22. The block 29 protrudes from the glass window 22 and jams the feeding of the document 24.

Furthermore, U.S. Pat. No. 5,379,095 discloses a small piece of glass window is adhered on a large glass window so as to form a height difference in FIG. 8. The thickness of the small glass window is required to be thin so as to keep the scope of the area to be scanned in the effective focal depth, thereby causing breakage during adhering. Alternatively, the area where the small glass window is to be adhered has to be maintained in a high standard of cleanness, or the dust located between the two glass windows affects the quality of scanning.

SUMMARY OF THE INVENTION

The first object of the present invention is to provide a flat-bed scanner in combination with a sheet feeder, and which makes the documents to be fed smoothly.

The second object of the present invention is to provide a flat-bed scanner in combination with a sheet feeder, and the assembly processes are simplified.

The third object of the present invention is to provide a flat-bed scanner in combination with a sheet feeder, and a good quality of scanning is obtained.

The fourth object of the present invention is to provide a flat-bed scanner in combination with a sheet feeder, wherein the volume of the scanner is reduced.

The fifth object of the present invention is to provide a flat-bed scanner in combination with a sheet feeder, wherein the manufacturing cost is reduced.

According to the objects and features, the present invention uses the height difference to move the documents from the first glass window to the low guide plate and thereby getting rid of the jamming during feeding of the document.

The present invention provides a flat-bed scanner which is used with a sheet feeder which feeds sheets of documents to be scanned. The flat-bed scanner includes a first glass window and a second glass window. The first glass window is installed on the flat-bed scanner so as to support the sheets of documents and has a top surface and a bottom surface. The top surface faces the sheet feeder and the bottom surface faces the interior of the scanner. The second glass window is located adjacent the first glass window, and includes a top surface and a bottom surface. The top surface faces the sheet feeder and the bottom surface faces the interior of the scanner. A height difference is formed between the two respective top surfaces of the two glass windows.

The present invention will become more obvious from the following description when taken in connection with the accompanying drawings which show, for purposes of illustration only, preferred embodiments in accordance with the present invention.

DETAILED DESCRIPTION OF THE PREFERRED EMBODIMENTS

Figure 1:
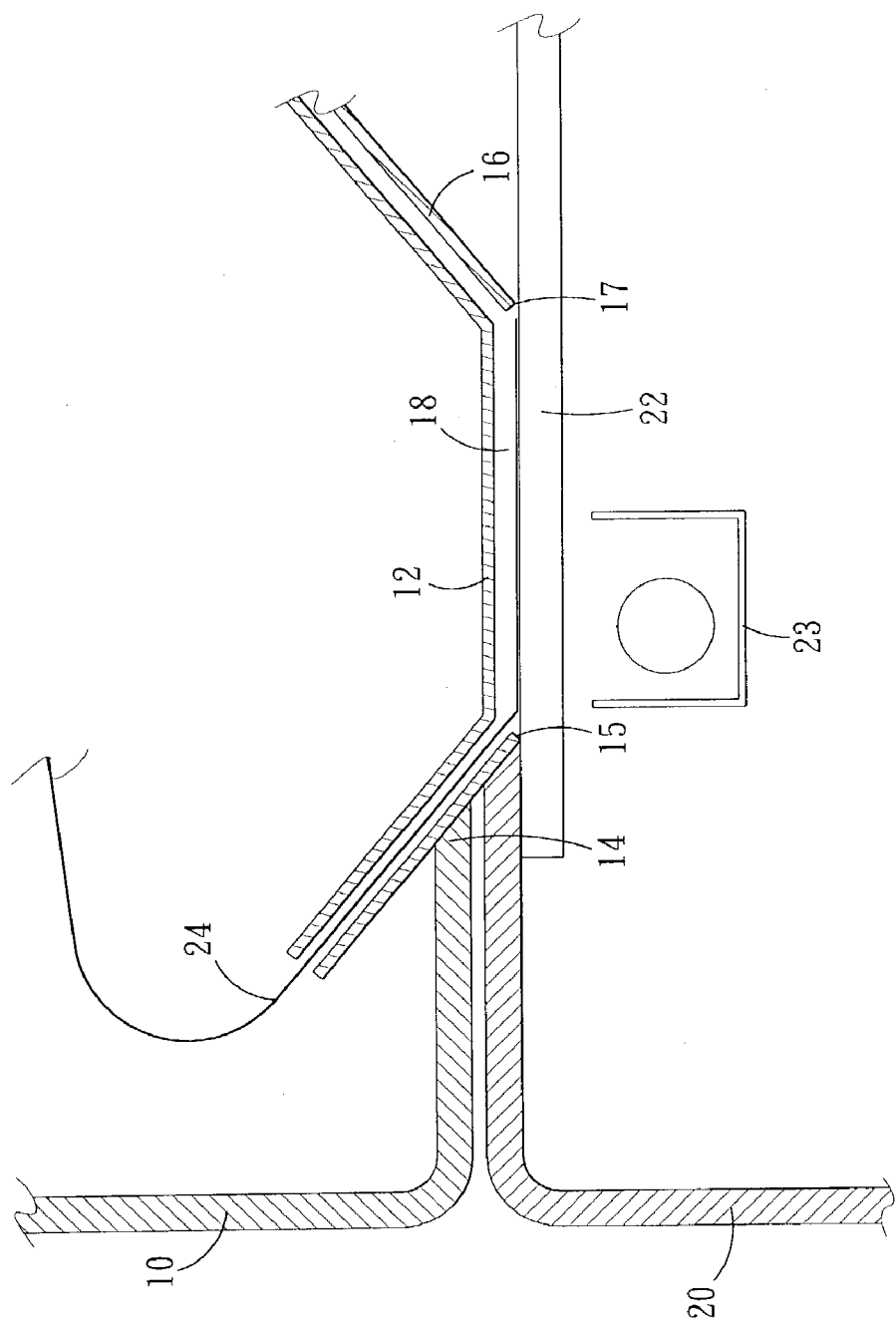
FIG. 1 shows a conventional feeder and scanner.
Figure 2:
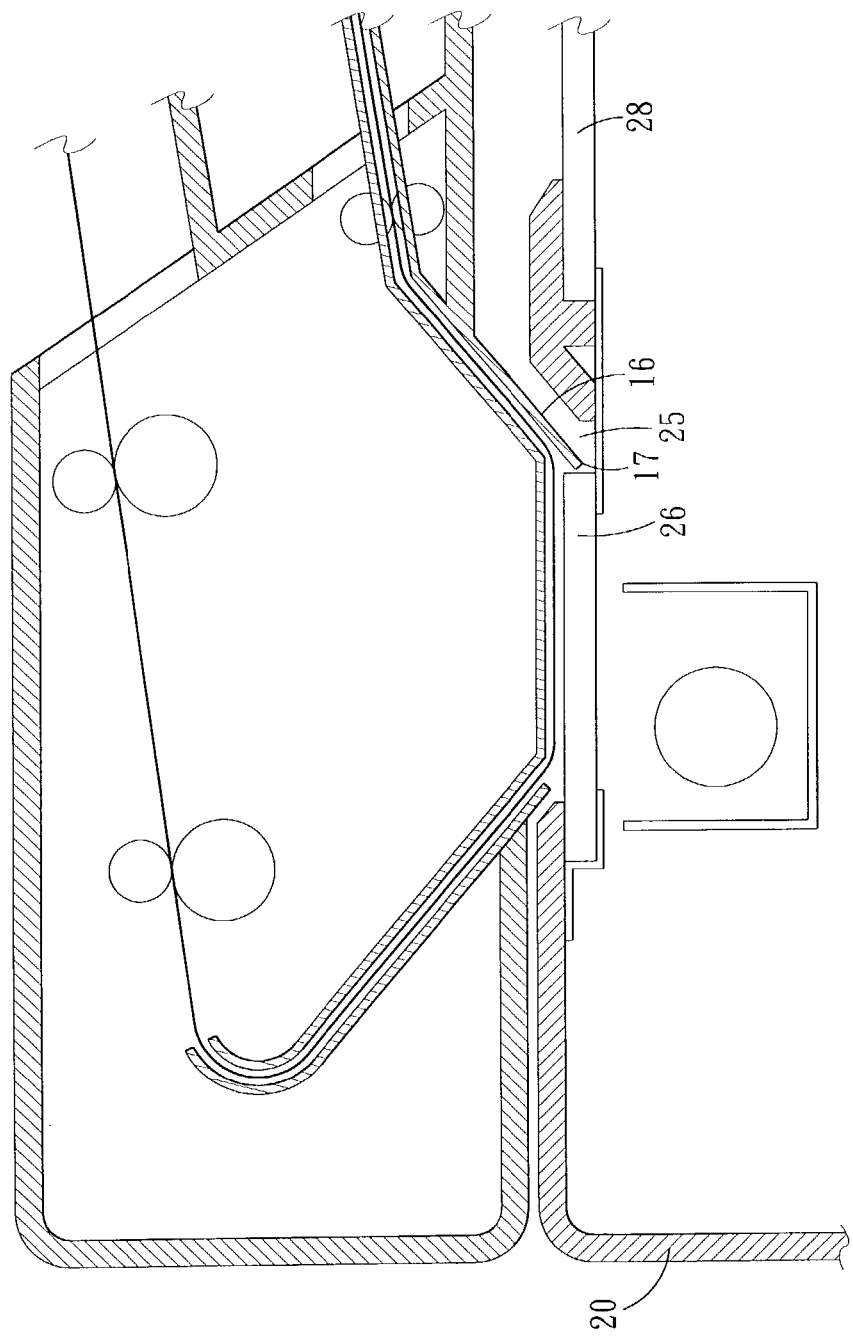
FIG. 2 shows another conventional feeder and scanner.
Figure 3:
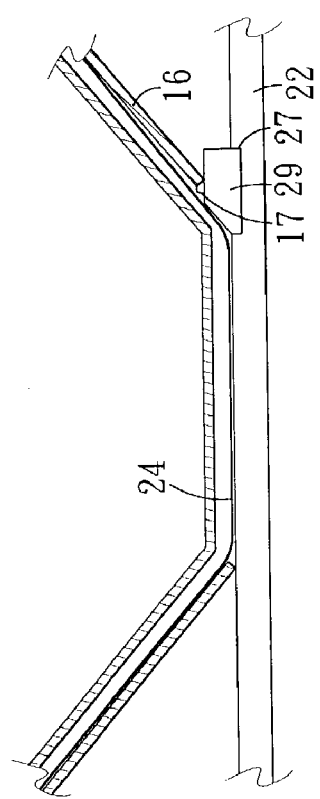
FIG. 3 shows yet another conventional feeder and scanner.
Figure 4:
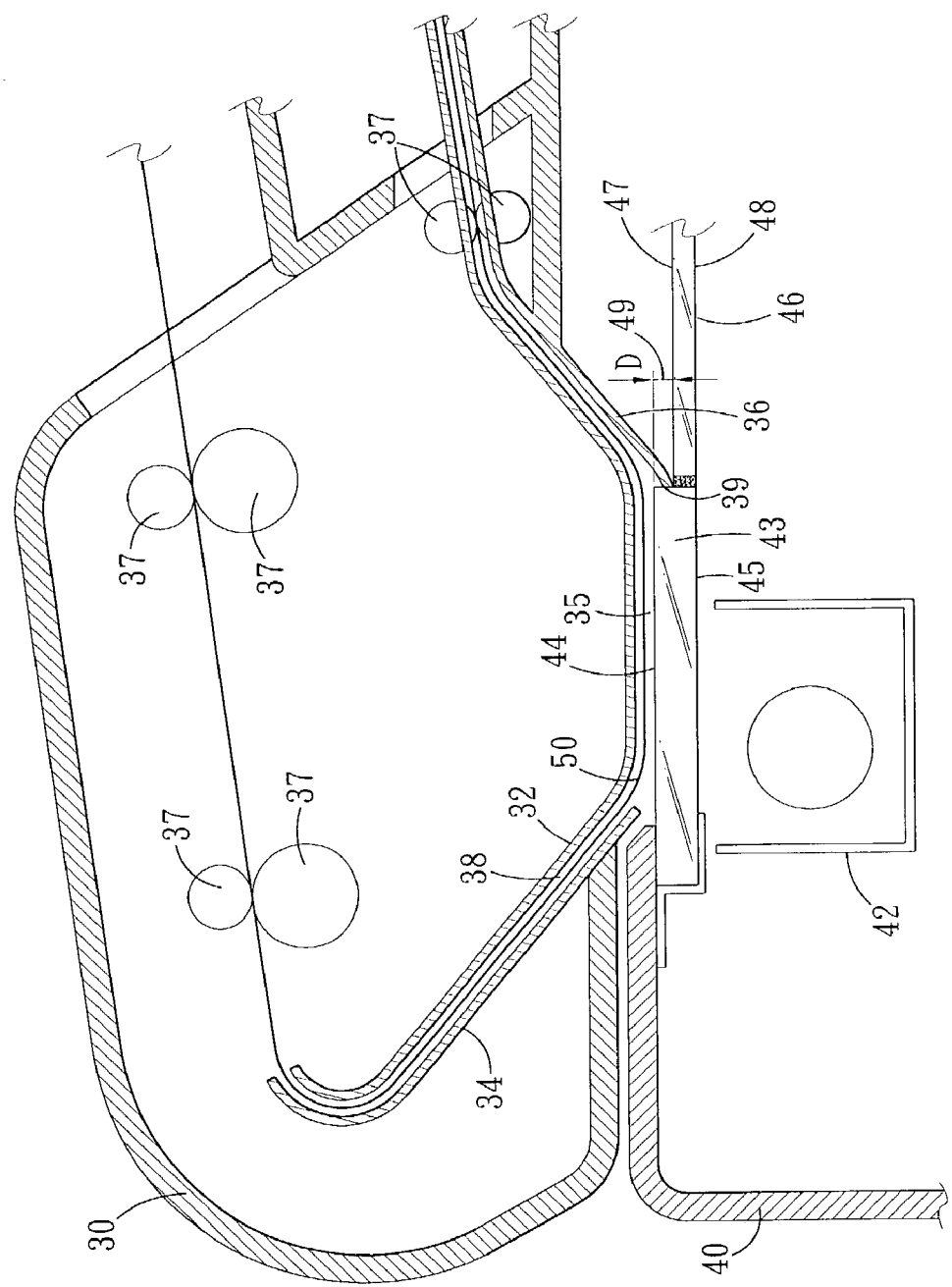
FIG. 4 shows the combination of the flat-bed scanner and a sheet feeder of the present invention.

Referring to FIG. 4 discloses a sheet feeder 30 which is installed above a scanner 40 and the sheet feeder 30 includes a top guide plate 32 and two low guide plates 34, 36. The top guide plate 32 faces the two low guide plates 34, 36 so as to form a passage 38 therebetween. It is to be noted that the two low guide plates 34, 36 are separated from each other and a scanning gap 35 is defined between the two low guide plates 34, 36.

Besides, a plurality of adjacent rollers 37 are located in the inside of the feeder 30 so as to transport the sheets 50 in the feeder 30.

The scanner 40 is a flat-bed scanner and has a movable scanning module set 42 in the inside of the scanner 40. The scanning module set 42 includes optical parts such as a light source, reflection mirror set and image sensor which can also be a contact-image-sensor (CIS) module set.

The scanner 40 has a first glass window 43 and a second glass window 46 which is adhered to the first glass window 43. The adhering process can be done during the manufacturing of the glasses.

The surface of the first glass window 43 that faces the feeder 30 is defined as the top surface 44, and the surface of the first glass window 43 that faces the interior of the scanner 40 is defined as the bottom surface 45. Similarly, the surface of the second glass window 46 that faces the feeder 30 is defined as the top surface 47, and the surface of the second glass window 46 that faces the interior of the scanner 40 is defined as the bottom surface 48.

It is to be noted that the first glass window 43 is thicker than the second glass window 46, and when the two glass windows 43, 46 are adhered with each other, the two respective bottom surfaces 45, 48 are located at the same horizontal plane. By this arrangement, the top surface 44 is higher than the top surface 47. The height difference D is defined as the height difference 49.

The feeder 30 is located above the scanner 40 and the scanning gap 35 faces the first glass window 43. The end 39 of the bottom plate 36 is located in the height difference 49 such that the end 39 is located below the top surface 44 of the glass window 43.

When proceeding scanning, the document 50 moves in the passage 38 and the scanning module set 42 is located below the first glass window 43. When the document 50 moves over the scanning gap 35, the scanning module set 42 scans the document 50.

When the document 50 moves to the low guide plate 36, because the end 39 of the low guide plate 36 is lower than the top surface 44 of the first glass window 43, the document 50 can be smoothly moved to the surface of the low guide plate 36 by the height difference 49. The document 50 is then moved out from the passage 38 by the rollers 37.

The height difference 49 between the top surface 44 of the first glass window 43 and the top surface 47 of the second glass window 46 is described by the embodiment hereinabove makes the installation of the low guide plate 36 to be easy. The height difference 49 makes the end 39 of the low guide plate 36 to be below the top surface 44 such that the document 50 can be moved smoothly.

Furthermore, because the first glass window 43 and the second glass window 46 are adhered with each other when assembling the scanner 40, so that the two glass windows 43, 46 can be installed to the scanner 40 in one assembling action.

The first glass window 43 and the second glass window 46 are two individual parts so that there needs no second time machining and can be made conveniently. For the cost of the raw material of a scanner 40, no extra cost is suffered.

Because the first glass window 43 has even physical characteristics and the document 50 can be move smoothly so that the scanning module set 42 can have a good quality of scanning images.

Figure 5:
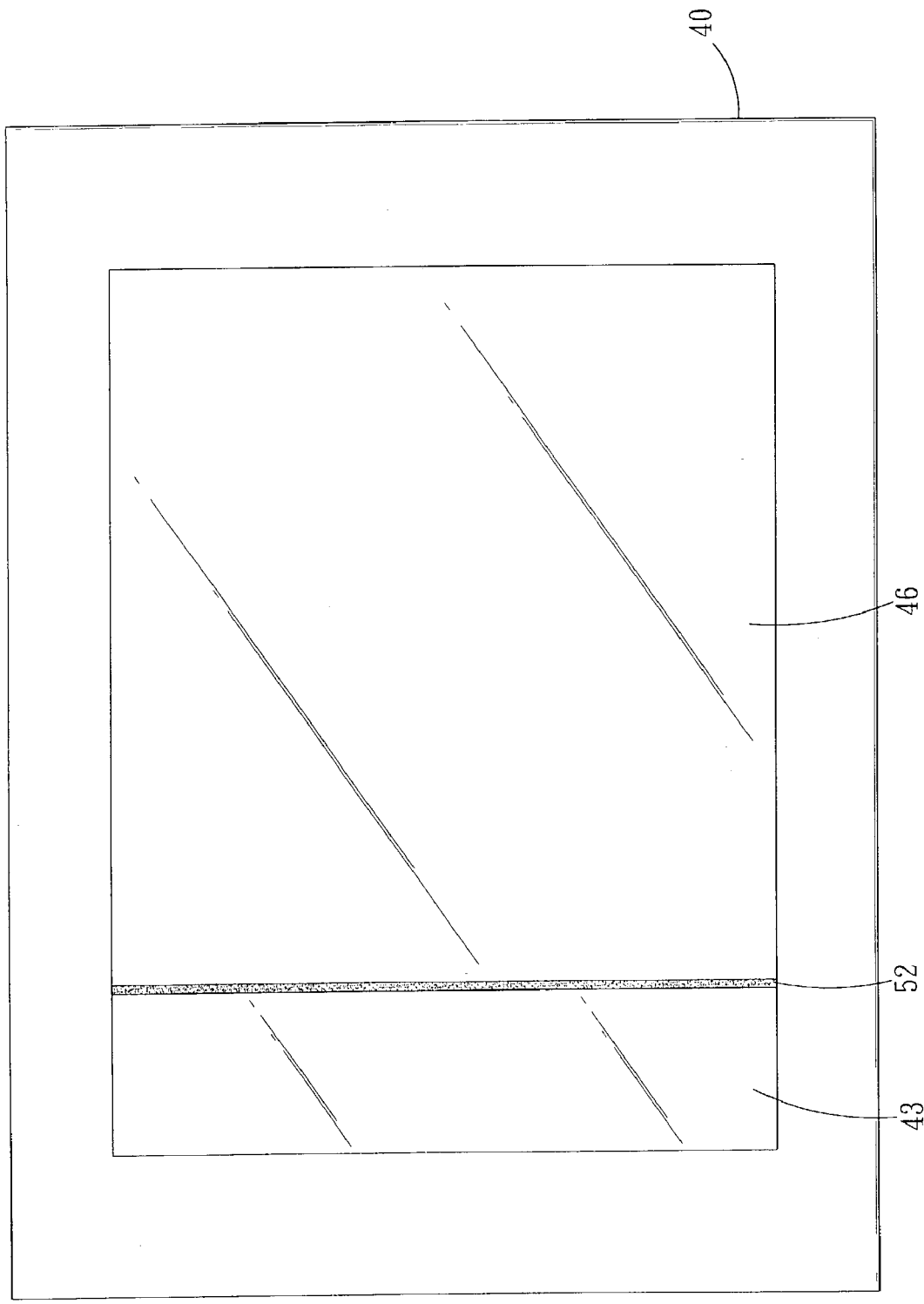
FIG. 5 is a top view to show the scanner of the present invention.

FIG. 5 shows a top view of the scanner 40, a small adhering width 52 is existed between the first glass window 43 and the second glass window 46. The adhering width 52 can be reduced to minimum under the precise adhering process, such that the whole volume of the scanner 40 is not increased too much. In other words, by adhering the first glass window 43 and the second glass window 46, the scanner can be made smaller. Alternatively, the combination of the two glass windows can be made by using the casing of the scanner or any way that is alike the previous way. Whether or not the two glass windows are to be adhered depends on the need of design.

Figure 6:
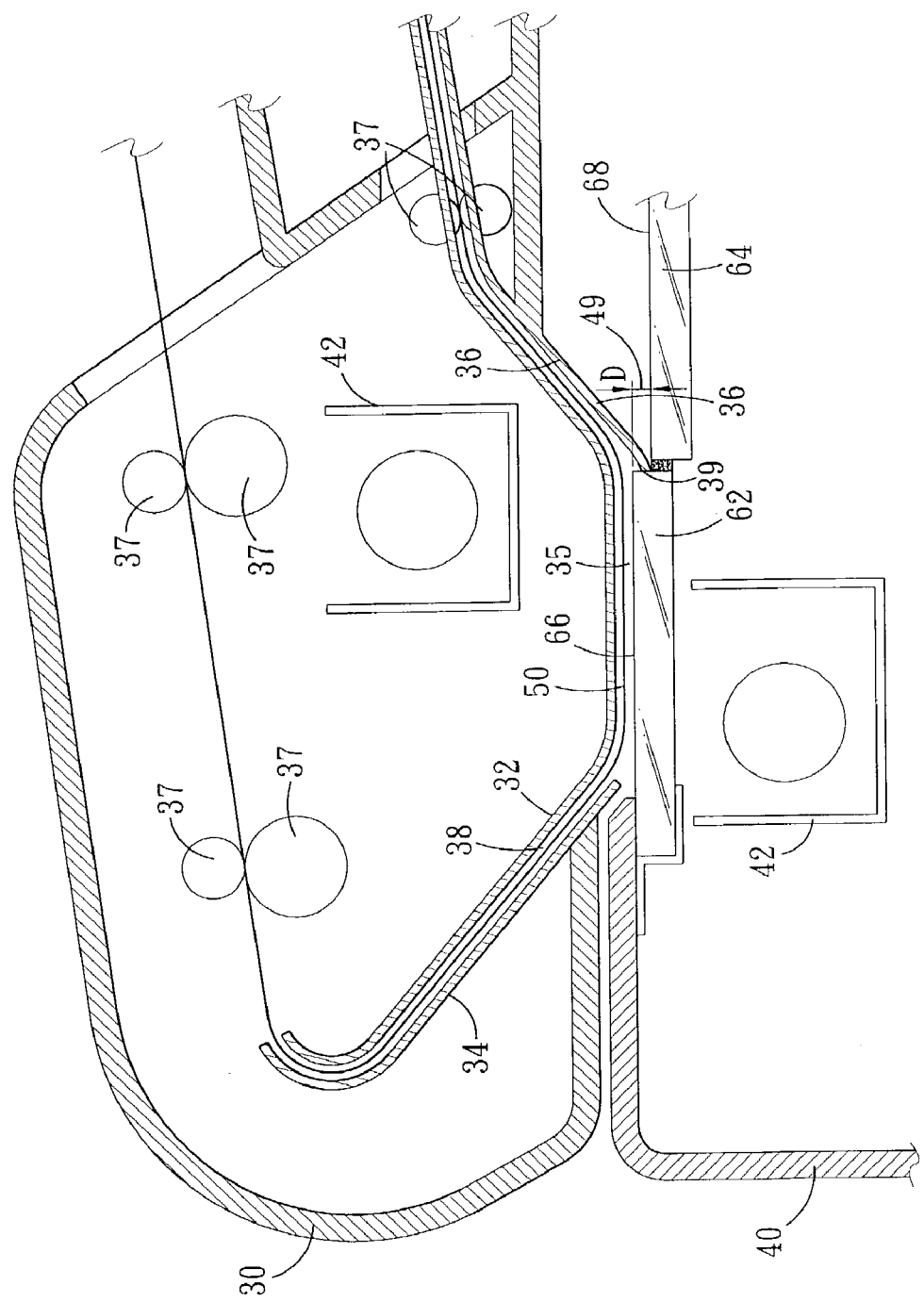
FIG. 6 shows another arrangement of the combination of the flat-bed scanner and a sheet feeder of the present invention.

FIG. 6 discloses another structure that includes the height difference 49. The first glass window 62 and the second glass window 64 have the same thickness so that when the two glass windows are adhered with each other, the first glass window 62 is arranged to be higher than the second glass window 64. The top surface 66 of the first glass window 62 is higher than the top surface 68 of the second glass window 64. The difference D of the two top surfaces 66, 68 is defined as a height difference 49 which is helpful for assembling the low guide plate 36 and the movement of the document 50.

In the embodiment above, the feeder 30 may have another scanning module set 42 which works in cooperation with the scanning module set 42 in the scanner 40 to proceed double-sided scanning.

While we have shown and described the embodiments in accordance with the present invention, it should be clear to those skilled in the art that further embodiments may be made without departing from the scope of the present invention.

What is claimed is:

1. A combination of a flat-bed scanner and a sheet feeder, the flat-bed scanner and the sheet feeder proceeding sheet-feeding scanning, the flat-bed scanner comprising:
    a first glass window arranged on the flat-bed scanner so as to support documents coming from the feeder, the first glass window including a top surface and a bottom surface, the top surface facing the feeder and the bottom surface facing the interior of the scanner, and
    a second glass window arranged on the flat-bed scanner and adjacent the first glass window, the second glass window including a top surface and a bottom surface, the top surface of the second glass window facing the feeder and the bottom surface of the second glass window facing the interior of the scanner, a height difference between the top surface of the first glass window and the top surface of the second glass window;
    wherein the height difference is formed because the first glass window and the second glass window are located at different positions.

2. The combination as claimed in claim 1, wherein height difference is formed because of the different thickness of the first glass window and the second glass window.

3. A combination of a fiat-bed scanner and a sheet feeder, comprising:
    a sheet feeder for feeding document and having a top guide plate and at least one low guide plate, and
    a flat-bed scanner above which the sheet feeder is located, the flat-bed scanner comprising:
    a first glass window arranged on the flat-bed scanner so as to support documents coming from the feeder, the first glass window including a top surface and a bottom surface, the top surface facing the feeder and the bottom surface facing the interior of the scanner, a passage defined between the first glass window of the scanner and the top guide plate and the at least one low guide plate of the feeder, and a second glass window arranged on the flat-bed scanner and adjacent the first glass window, the second glass window including a top surface and a bottom surface, the top surface of the second glass window facing the feeder and the bottom surface of the second glass window facing the interior of the scanner, a height difference between the top surface of the first glass window and the top surface of the second glass window, an end of the at least one low guide plate inserted in the height difference so as to guide the document to leave away from the feeder;

wherein the height difference is formed because the first glass window and the second glass window are located at different positions.

4. The combination as claimed in claim 3, wherein height difference is formed because of the different thickness of the first glass window and the second glass window.

5. The combination as claimed in claim 3, wherein feeder includes a scanner module set so as to cooperate with the flat-bed scanner to proceed double-sided scanning.

* * * * *